May 6, 1930. J. T. COWLEY ET AL 1,757,416
AUTOMATIC CONVEYER
Filed Nov. 19, 1927    10 Sheets-Sheet 7
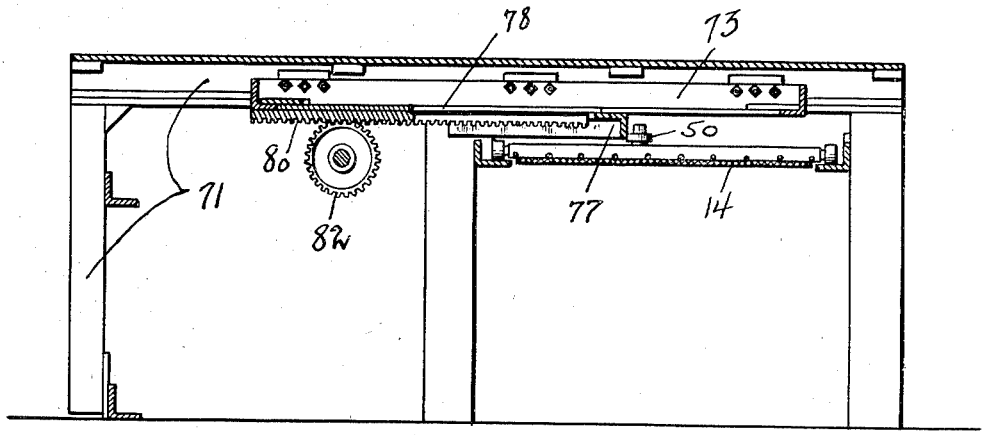
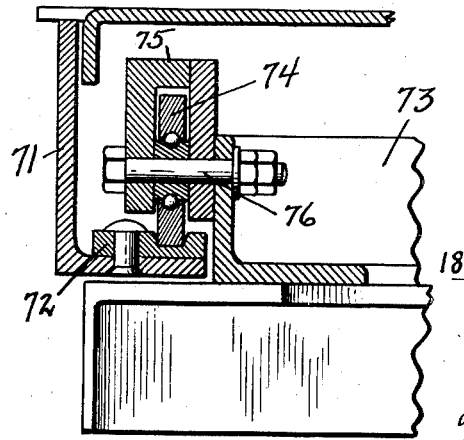
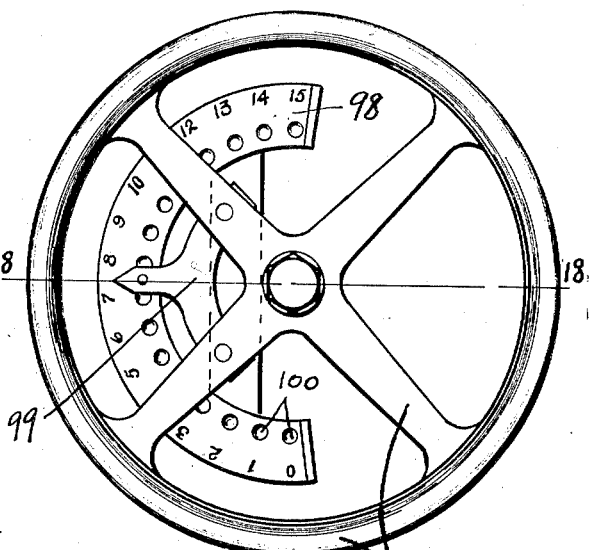
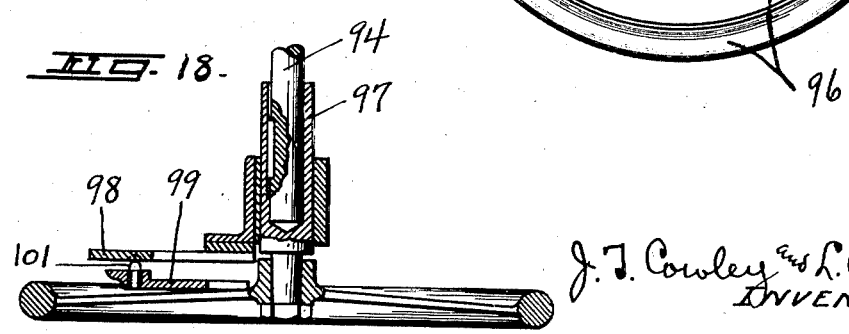
J. T. Cowley and L. C. Allen
INVENTORS
Denison & Thompson
BY ATTORNEYS.
WITNESS
H. T. Hurst.

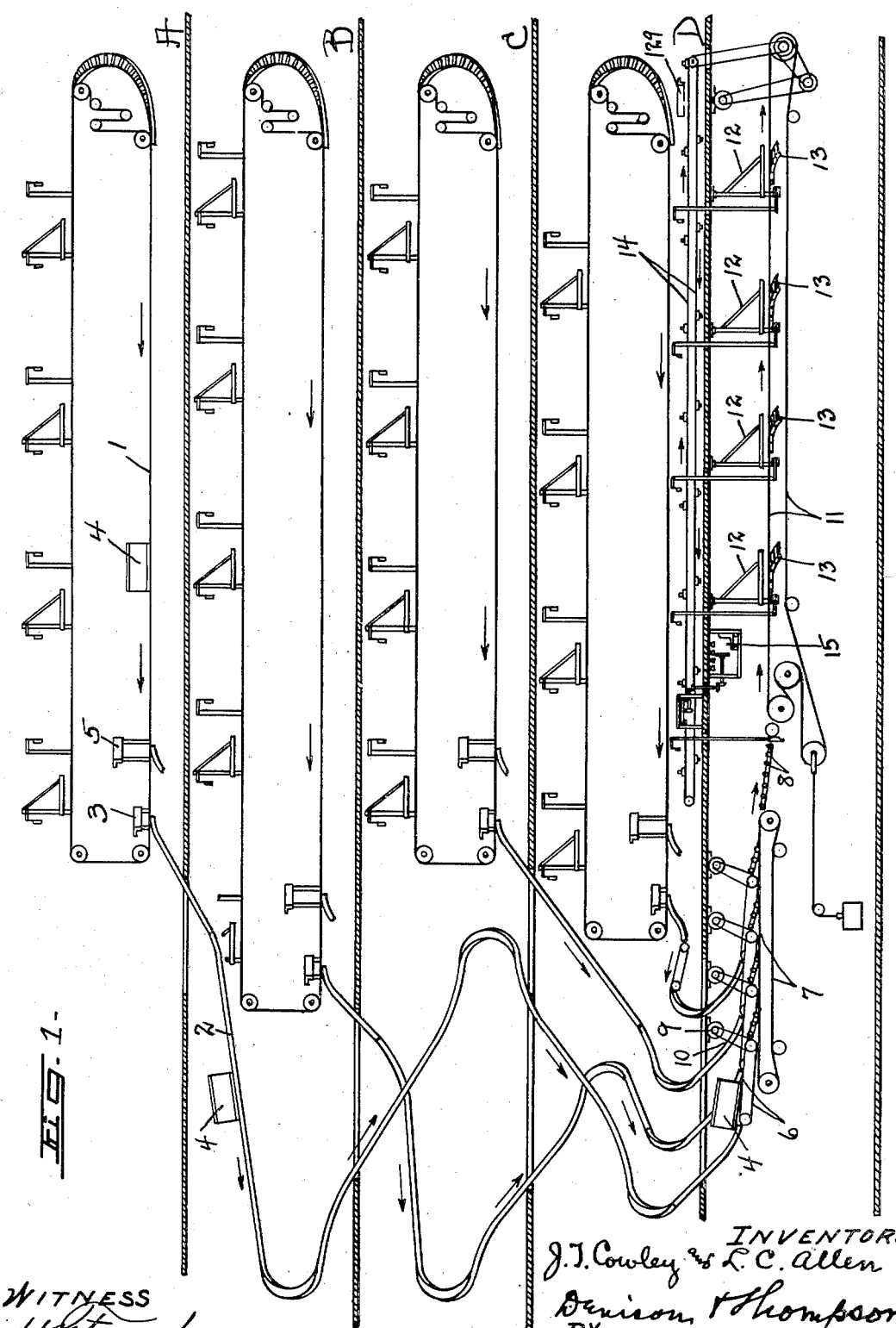

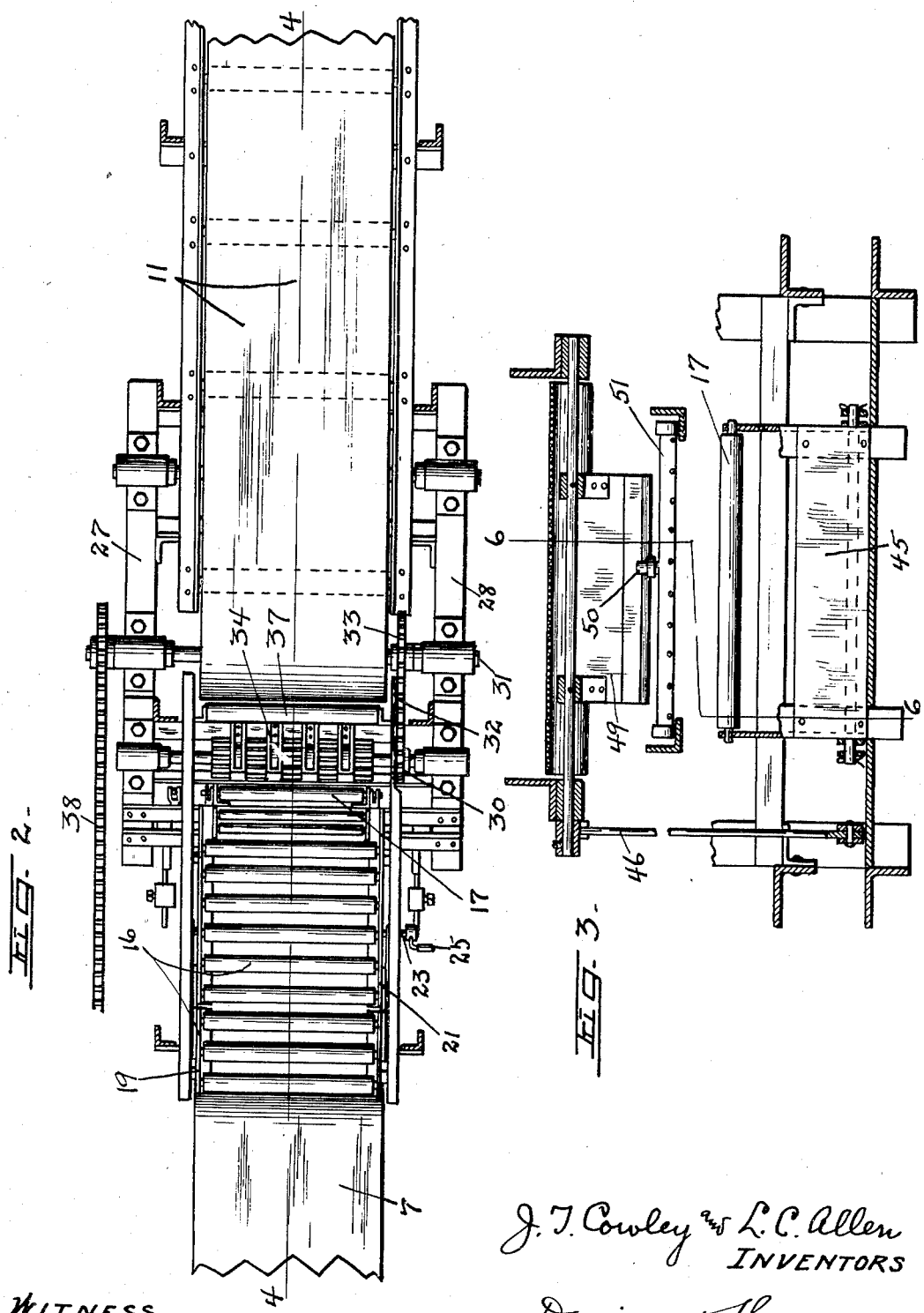

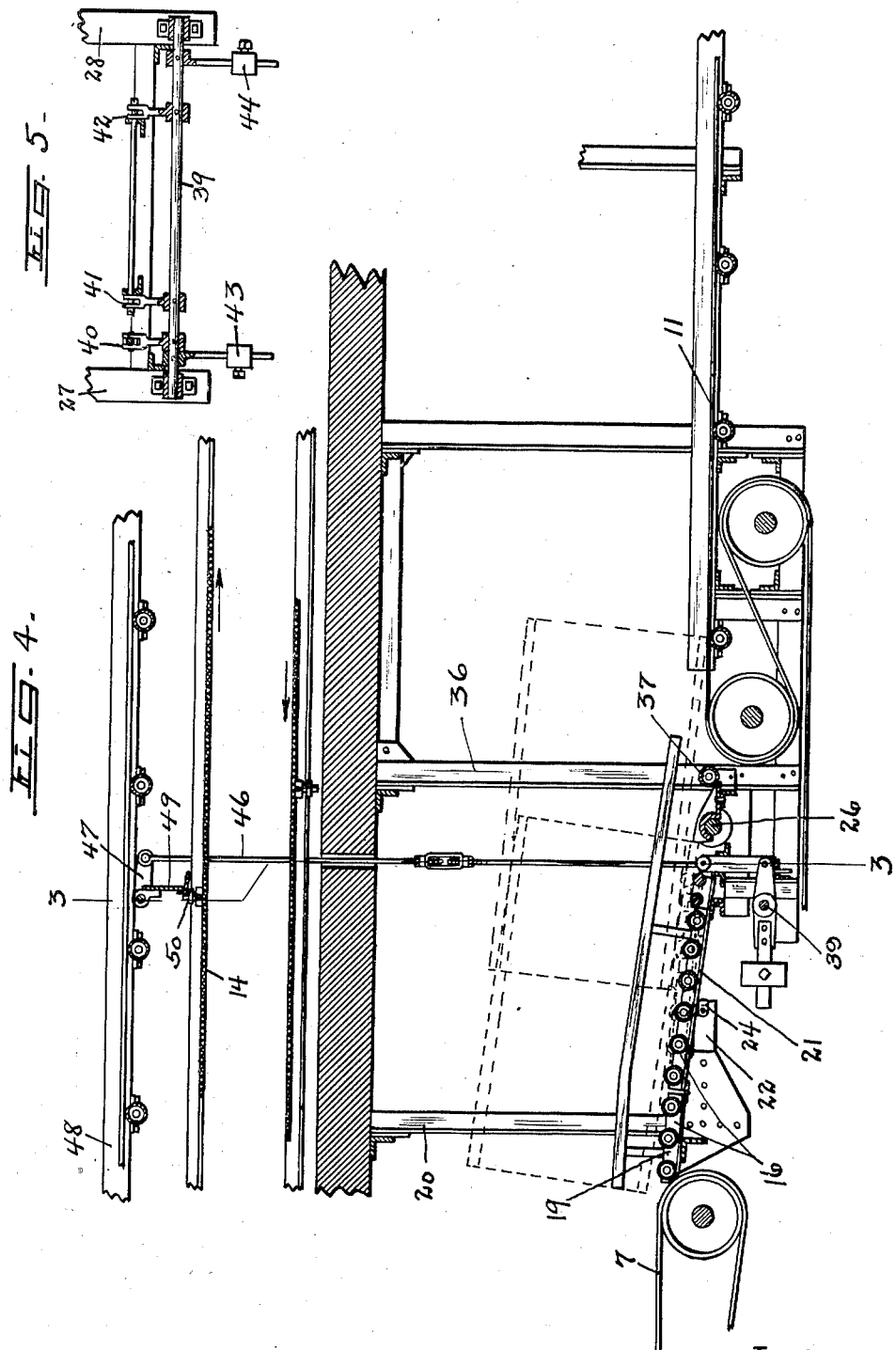

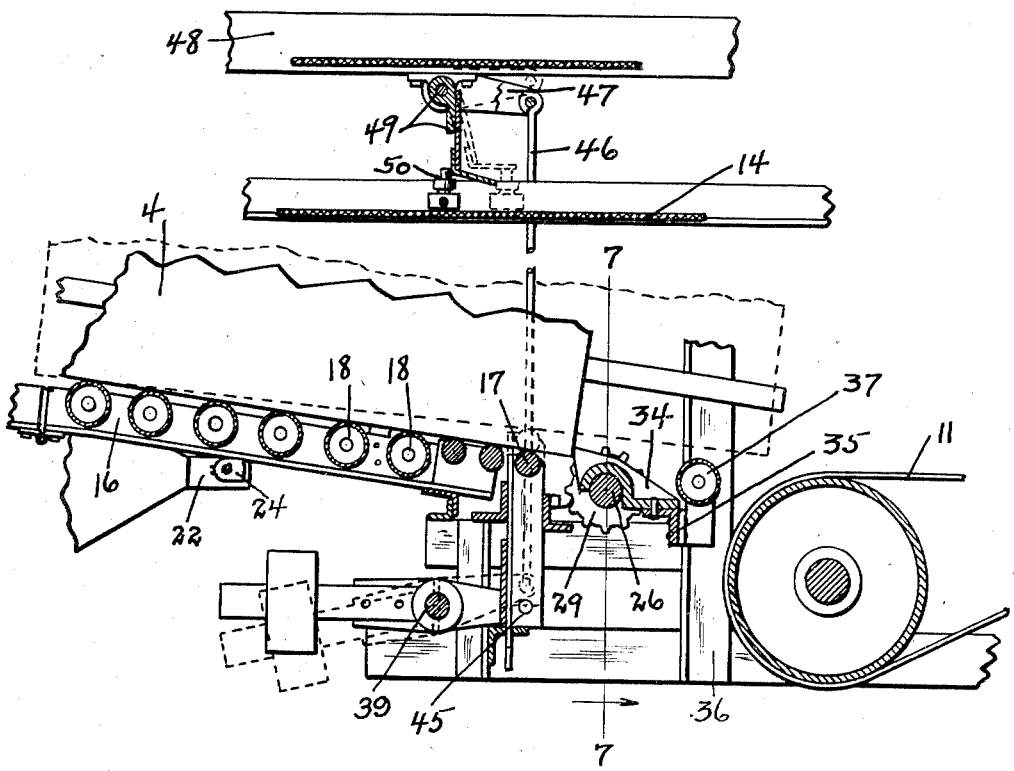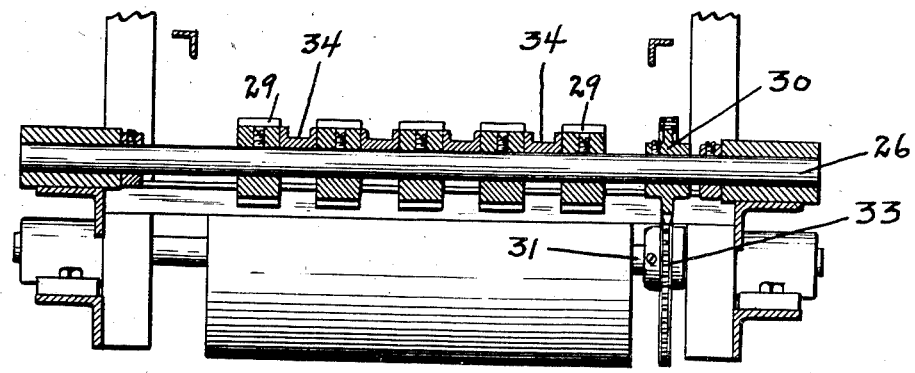

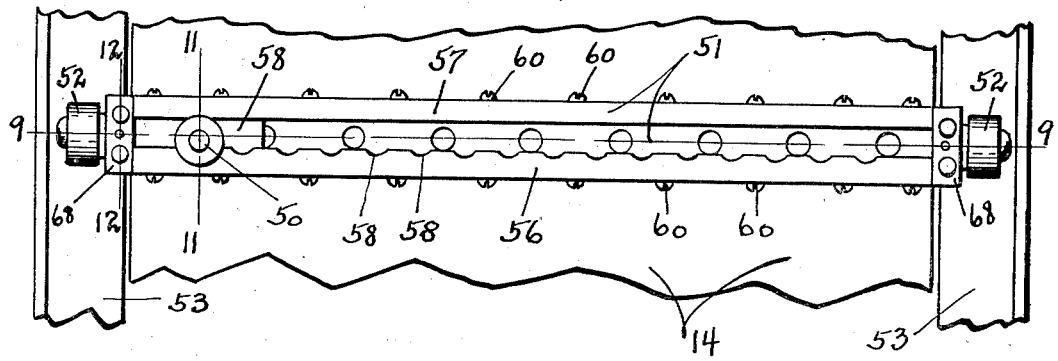
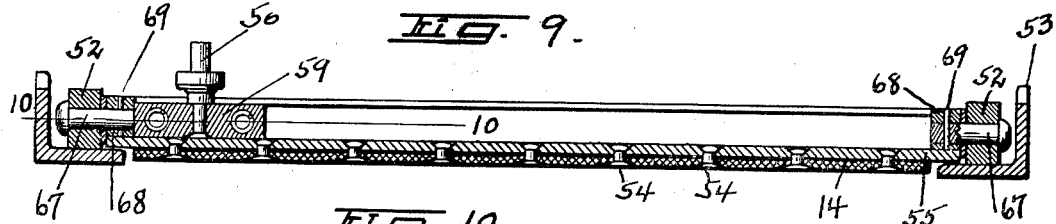
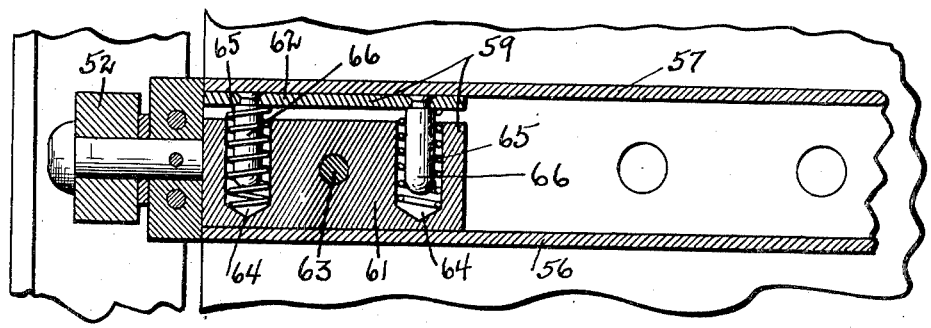
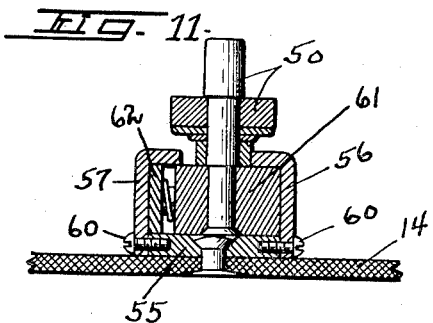
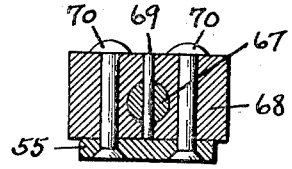

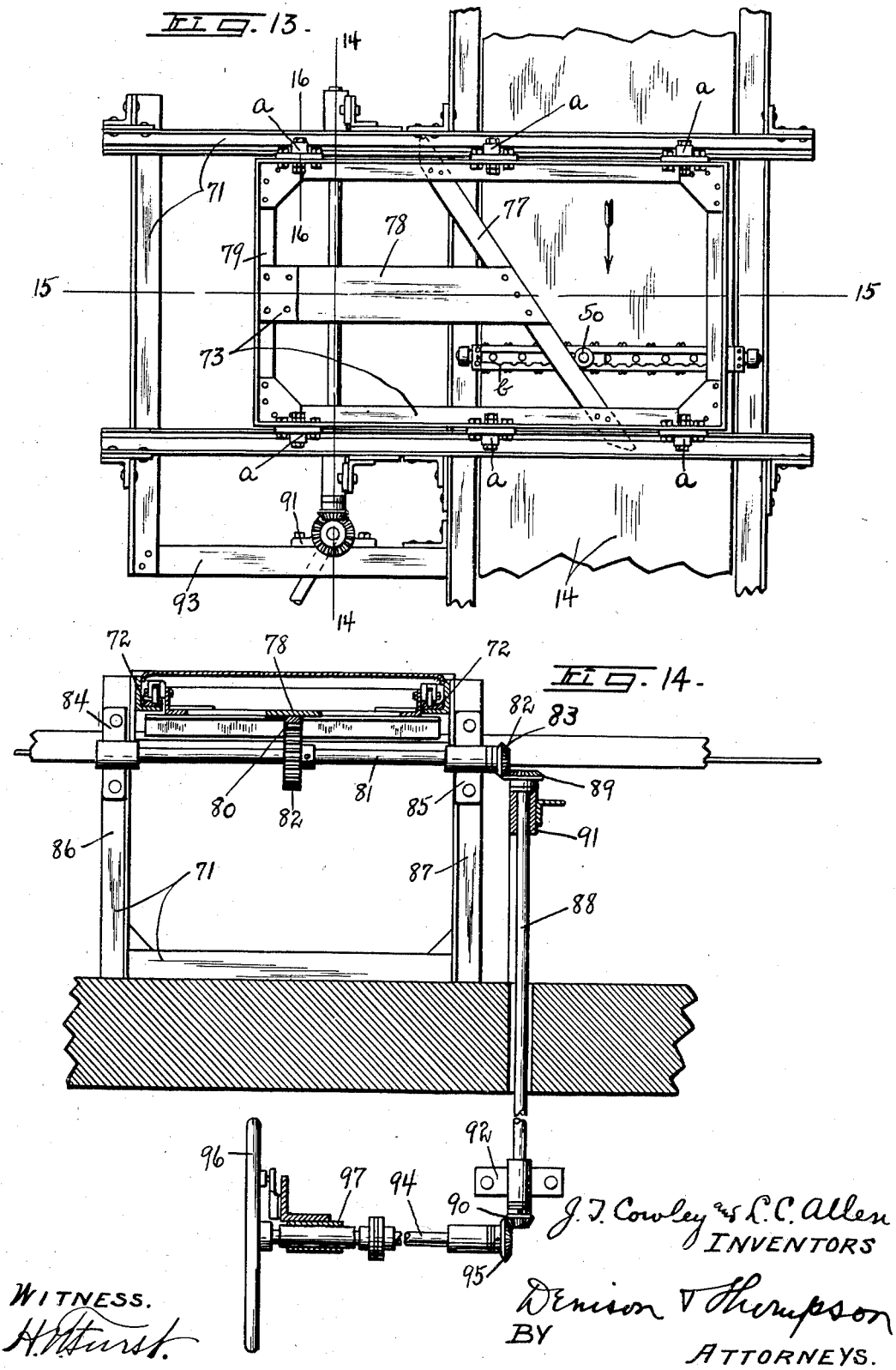

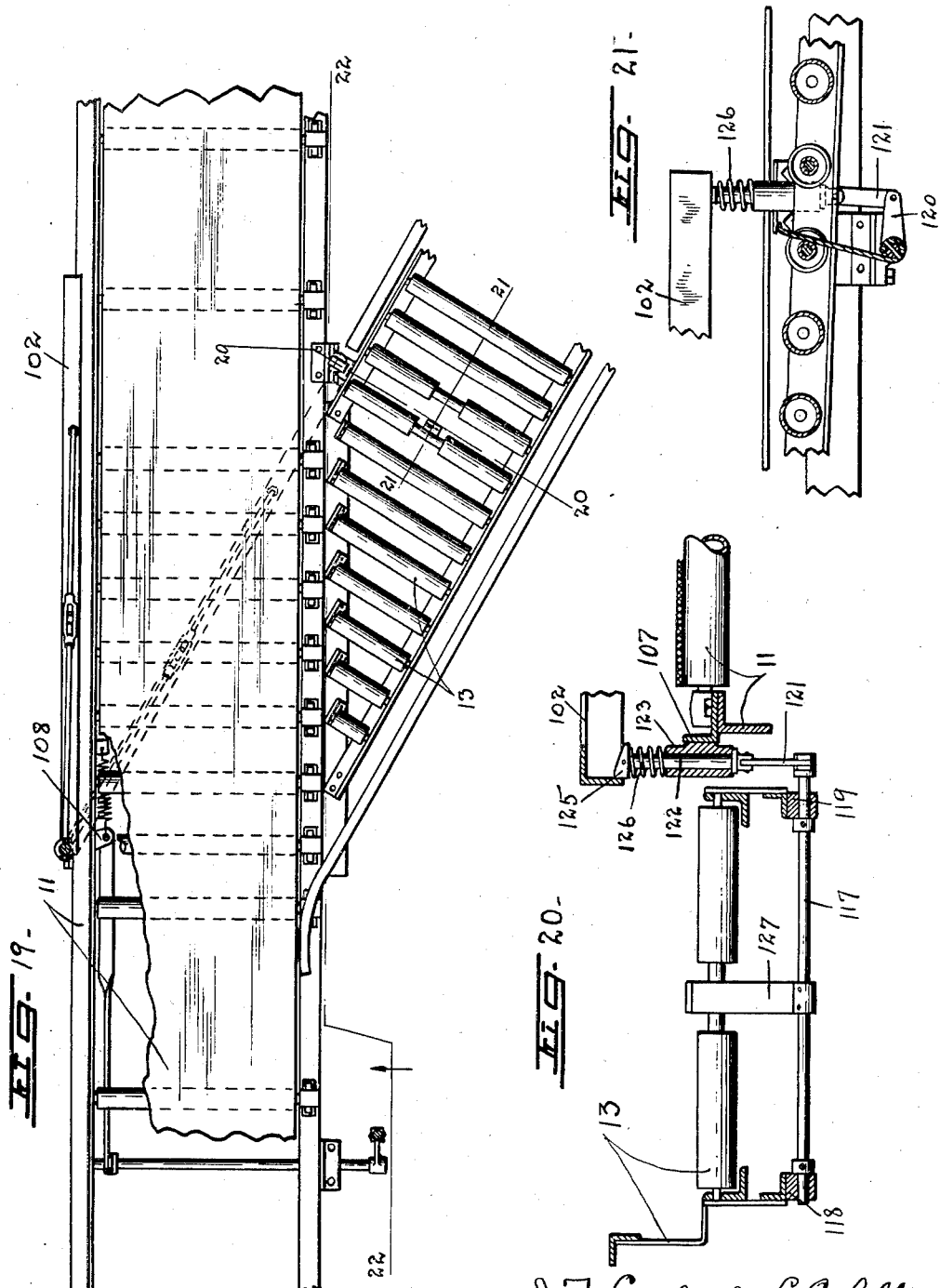

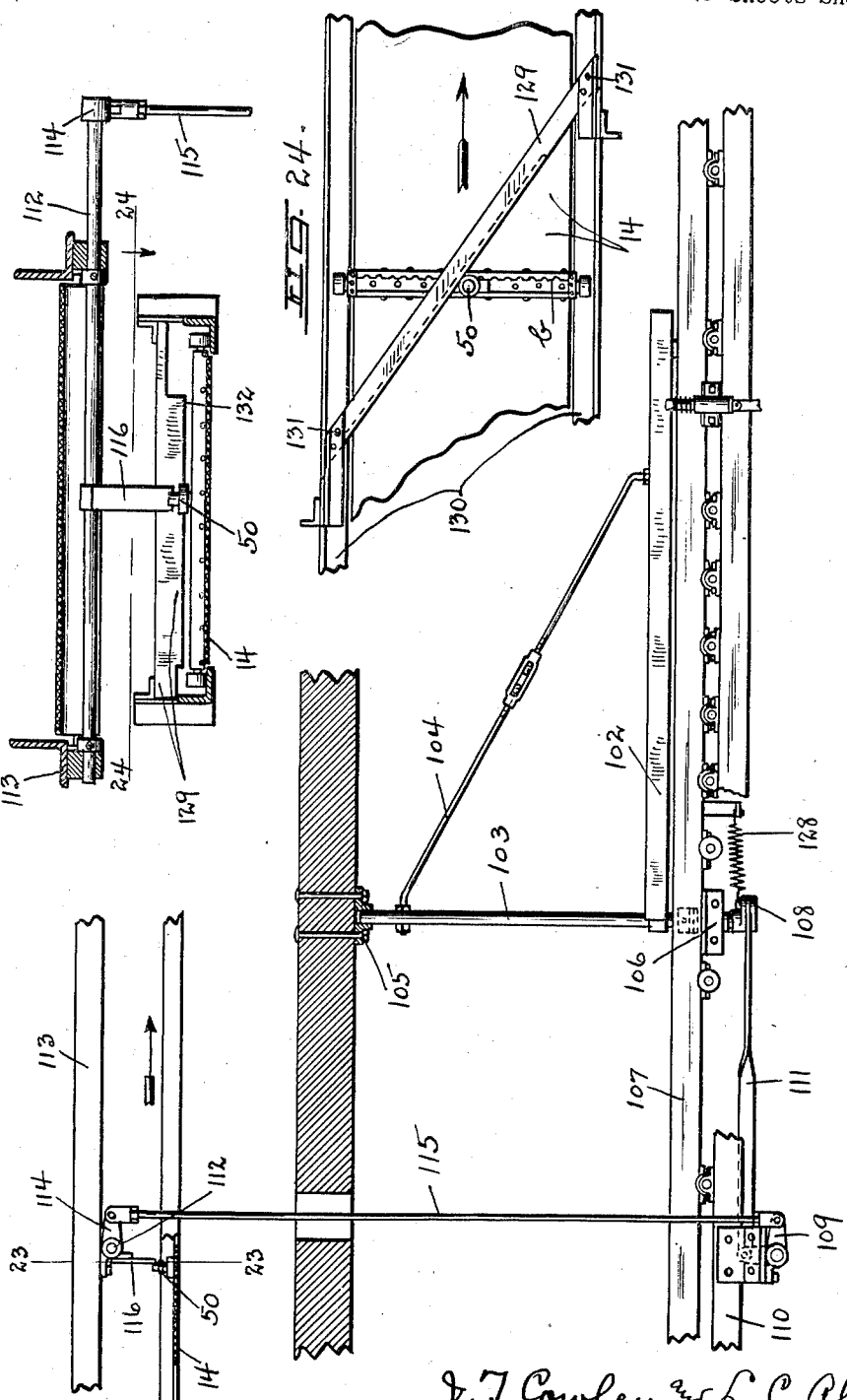

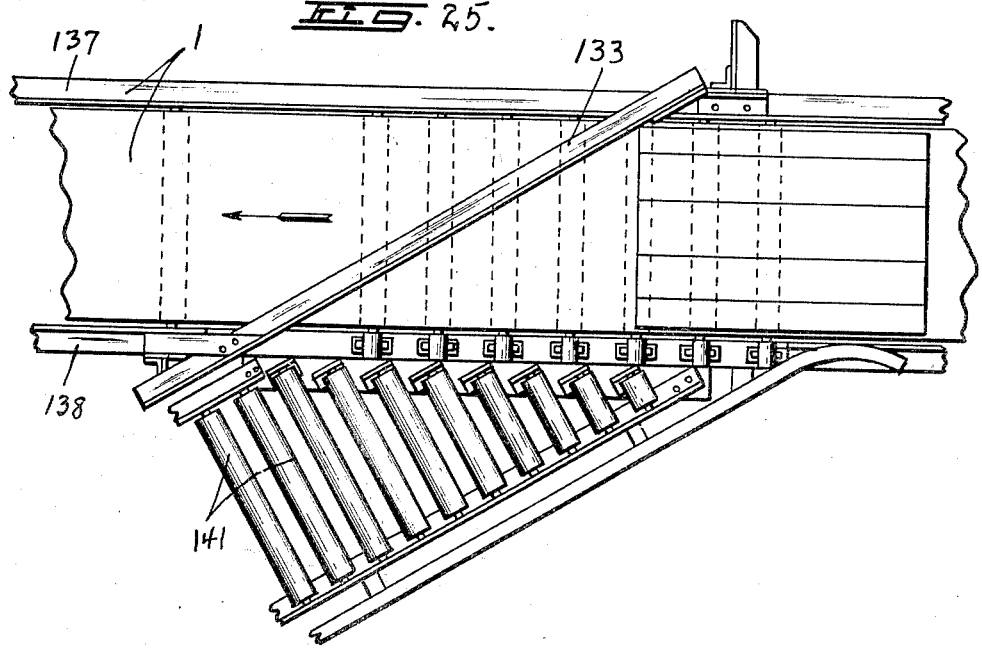
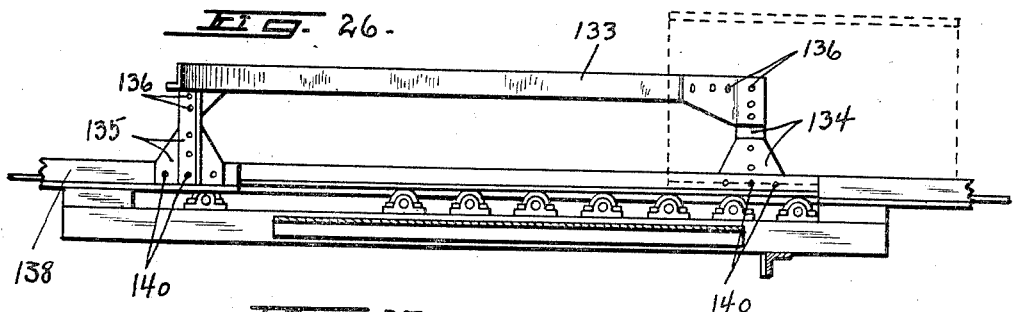
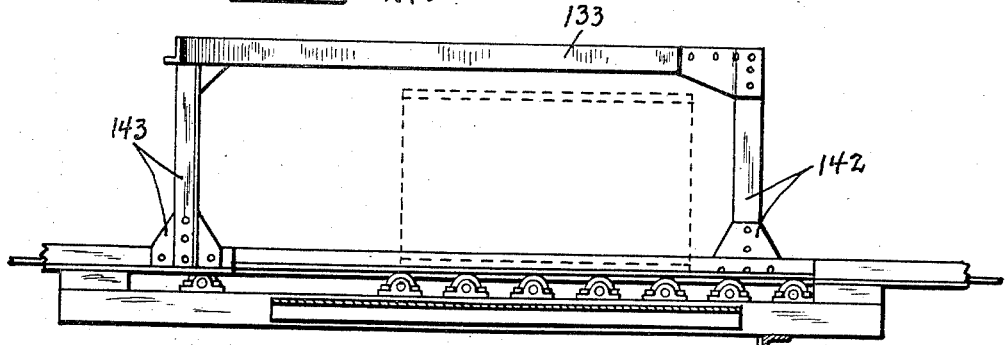

Patented May 6, 1930

1,757,416

UNITED STATES PATENT OFFICE

JAMES T. COWLEY AND LAVONT C. ALLEN, OF SYRACUSE, NEW YORK, ASSIGNORS TO THE LAMSON COMPANY, OF SYRACUSE, NEW YORK, A CORPORATION OF MASSACHUSETTS

AUTOMATIC CONVEYER

Application filed November 19, 1927. Serial No. 234,530.

This invention relates to automatic merchandise conveyers and a new and improved mechanism for deflecting such merchandise from one part of the conveyer to another.

In the operation of mechanical conveyers where it is desired to deflect merchandise from a main conveyer on to one of several branch conveyers, as desired, it is a great advantage to have a means whereby an operator stationed in a permanent position may control the deflection of merchandise at points remote from his station, and be able to select, at the time merchandise is passing him, the exact point at which it will be deflected from the main conveyer.

As means whereby this result can be attained by the operator without it being necessary for him to leave his station or come in contact with the merchandise itself is particularly advantageous, for it permits the operation of the conveyer with the minimum amount of human attention.

The main object of our invention is to provide a means whereby deflecting means remote from an operator may be selectively operated by him in such order and at such times as he may desire.

Another object is to provide a means whereby an operator may determine what articles are to be transported on a main conveyer, and to which of several remote branch conveyers they will, individually, be deflected.

Another object is to provide a means whereby a given group of merchandise-containers may be transported along a main conveyer without deflection on to any branch conveyer.

Other objects and advantages relate to the size, shape and arrangement of parts, all as will more fully appear from the following description taken in connection with the accompanying drawings, in which:

Figure 1 is a diagrammatic drawing of a conveyer system comprised of two-way feed belt conveyers, automatic movable deflectors, stationary deflectors, gravity conveyers and chutes, and a belt for operating automatic deflectors, together with a manually operated pin-setting device.

Figure 2 is a top plan of an automatic spacing device whereby crates of merchandise are evenly distributed upon the succeeding belt conveyer so as to synchronize with the deflector-tab-actuating belt.

Figure 3 is a detail vertical cross-section taken in the plane of line 3—3, Figure 4, showing the fed roll of the automatic spacer together with the pin-actuated tab which operates the feed roll.

Figure 4 is a longitudinal vertical section on the plane of line 4—4, Figure 2, showing the tab, the tab-actuating belt and the automatic spacing mechanism. The dotted position of the gravity conveyer indicates its position when it is desired to feed the crates of merchandise directly onto the belt conveyer without spacing.

Figure 5 is a section of the roller elevating means of the spacing device.

Figure 6 is an enlarged longitudinal vertical section of the automatic spacer showing the automatic stop, the corrugated feed-roll, together with the automatic feed-roll and its tab-actuating mechanism taken on the plane of line 6—6, Figure 3.

Figure 7 is a vertical cross-section of the feed-shaft, corrugated fed roll and automatic stop, taken in the plane of line 7—7, Figure 6.

Figure 8 is a detail plan view of a portion of the deflector-actuating belt, together with one of the selective pin controls carried thereby.

Figure 9 is a vertical cross-section of the deflector-actuating belt and selective pin control taken in the plane of line 9—9, Figure 8.

Figure 10 is a detail horizontal section of one end of the selective pin control taken in the plane of the line 10—10, Figure 9.

Figures 11 and 12 are detail vertical sections of the selective pin control taken in the plane of lines 11—11 and 12—12 respectively, Figure 8.

Figure 13 is a plan view of the automatic pin setting device together with a portion of the deflector operating belt.

Figure 14 is a vertical section taken in the plane of line 14, 14, Figure 13, showing the actuating means for the pin-setting device.

Figure 15 is a longitudinal vertical section taken in the plane of line 15, 15, Figure 13, showing the pin-setting bar and carriage therefor.

Figure 16 is a detail vertical section taken in the plane of line 16, 16, Figure 13, showing one of the carriage-supporting rollers, the track on which it is carried and a portion of the carriage adjacent thereto.

Figure 17 is a face view of the operating wheel for the automatic pin-setting device, together with the pin position indicator.

Figure 18 is a horizontal sectional view taken in the plane of line 18, 18, Figure 17.

Figure 19 is a plan view of a portion of a belt conveyer together with one of the single-acting deflector belt actuated deflectors, and a portion of the gravity conveyer operating in conjunction therewith.

Figure 20 is a vertical section taken in the plane of line 20, 20, Figure 19, showing the deflector bar latch and actuating means therefor.

Figure 21 is a vertical sectional view taken in the plane of line 21, 21, Figure 19.

Figure 22 is a side elevation of a portion of a belt conveyer, together with a single-acting automatic deflector and actuating means therefor, a portion of the intervening floor being in section, on line 22, 22, Fig. 19.

Figure 23 is a vertical section taken in the plane of line 23, 23, Figure 22, showing at the rear the resetting device for the selective pin control.

Figure 24 is a top plan of the resetting device for the selective pin control on line 24, 24, Fig. 23.

Figure 25 is a top plan of the deflector shown in the upper conveyer shown in Figure 1 where the same joins the chute.

Figure 26 is a side elevation of the deflector shown in Figure 25.

Figure 27 is a side elevation of the deflector shown in Figure 1 as positioned next to the deflector shown in Figures 25 and 26.

Although our device may be used in different places in a conveying system and for the purpose of accomplishing different results, it is particularly well adapted to be used as a distributing means for different types of merchandise which are held in storage until wanted, and in Figure 1 we have illustrated a conveying system in which our device is used for this purpose.

As illustrative of the functioning of our device, we have shown four storage floors, A, B, C and D, each one equipped with conveyers and chutes for the purpose of transporting merchandise to our device, but as the principle of each one is the same, a description of one will serve for a description of all, and we will take floor A as an example.

A conveyer —1— is positioned above floor A moving towards a chute —2— at the junction with which is a deflector —3— for causing the merchandise container —4— to move from the conveyer —1— into the chute —2—. A deflector —5— is also shown, but will not be described as it does not affect the functioning of our device.

The merchandise containers —4, 4— being loaded on conveyer —1— will move into chute —2— and thence downwardly to a conveyer —6— and come to rest, conveyer —6— being normally not in motion. It will be understood that sufficient merchandise containers —4, 4— will be sent down chute —2— so that a supply will always be available for further transportation. Similarly, merchandise containers from floors B, C and D will be sent down their respective chutes and to rest on conveyers similar to conveyer —6—.

Conveyer —6— and its companion conveyers from floors B, C and D are positioned so that when they are set in motion the merchandise containers carried by them will be carried onto a conveyer —7— and from thence to a spacing device —8— (hereinafter described). The movement of conveyer —6— (and its companion conveyers similarly) is controlled by the starting and stopping of a motor —9— which moves the conveyer —6— by means of belt —10—. The merchandise containers —4, 4— pass from spacing device —8— at the will of the operator onto distributing conveyer —11— which carries them to whichever of deflectors —12, 12— and branch conveyers —13, 13— the operator may have selected by means of selecting belt —14— (hereinafter described).

The position of the operator is shown in this case as at —15—. It will be understood that although we have shown four storage floors A, B, C and D, and four branch conveyers —13, 13— as many or as few storage places and branch conveyers may be used as circumstances require.

The spacing device —8— is for the purpose of placing the merchandise containers —4, 4— onto conveyer —11— in fixed spaced relation so that they will arrive at a branch conveyer —13— at pre-determined intervals. The construction of spacing device —8— is shown in Figures 2, 3, 4, 5 and 6 and consists of a short section of conveyer —16— (here shown as a type known as gravity roller conveyer) inclined downwardly from conveyer —7—. The front roller —17— is independent of conveyer —16— and while normally having its upper edge in the same plane as the upper edges of the rollers —18, 18— of conveyer —16— is capable of vertical movement by a means hereinafter described.

Spacing device —8— has a rear portion —19— supported by frame —20— and a forward portion —21— hingedly connected to rear portion —19— for vertical movement and in its normal position is held against downward movement by stop —22—. A shaft —23— is journaled in stop —22— and carries at each end (one shown) a cam member —24— so positioned that the rotation of shaft —23— by means of crank —25— will cause cam members —24— to bear against forward portion 21 and raise the same.

At the lower end of spacing device —8— and between it and conveyer —11— a shaft —26— is journaled in side frames —27, 28, and carries a plurality (in this case shown as five) of spaced corrugated annular flanges —29, 29— and a gear —30— operatively connected to shaft —31— by means of chain —32— and gear —33, shaft —31— being journaled in frames —27, 28— in spaced relation to shaft —26—.

Stop members —34, 34— (in this case shown as four) are affixed to a cross-member —35— of frame —36— and extend rearwardly and upwardly between members —29, 29— towards spacing device —8—. The position of stop members —34, 34— is such that when roller —17— and forward member —21— of spacing device —8— are in the lower or normal position, a merchandise container —4— on forward member —21— will strike stop members —34, 34— and be held against further forward movement.

The height of stop members —34, 34— with reference to roller —17— and members —29, 29— is such that when roller —17— is raised, in a manner hereinafter to be described, the container —4— will be raised above stop members —34, 34— and will move forward into engagement with members —29, 29—. An additional roller —37— is journaled in frame —36— and is so positioned that a container —4— moving forward from members —29, 29— will be supported on roller —37— until it passes to conveyer —11—.

Conveyer —11— is here shown as a usual type of belt conveyer and is kept continuously in motion by means of chain drive —38— from any convenient source of power (not shown).

The raising of roller —17— is accomplished in the following manner: A shaft —39— journaled in side frames —27— and —28— carries three forwardly extending crank-arms —40—, —41— and —42— and two rearwardly extended counter-weighted arms —43, 44—. Crank-arms —41, 42— are pivotally connected to the bottom of frame —45— in which is journaled at the top roller —17—.

Crank-arm —40— is connected by link —46— to a crank-arm —47— which is pivotally mounted on frame —48— immediately above the upper course of selecting belt —14—. Crank-arm —47— carries a depending tab —49— of a size and shape to be struck and raised by selective pin —50— in whatever position the pin —50— may be on selecting belt —14—. The dotted lines in Figure 6 show the relation of the parts when tab —49— has been raised by selective pin —50—.

The selecting belt —14— is positioned in a parallel plane above conveyer —11— and carries a means for actuating the deflectors on conveyer —11— in a manner hereinafter described.

The selective pin structure carried by the selecting belt —14— and the means for operating the same are best shown in Figures 8 to 18 inclusive. A cross-head —51— extends transversely the width of the belt —14— and carries at each end a roller —52— supported by side-rails —53—. Rollers —52— rotate on pins —67— which are held in position in block —68— by means of pin —69—, block —68— being secured to bottom plate —55— by rivets —70, 70— or other convenient means.

Cross-head —51— is secured to belt —14— by rivets —54, 54— or other convenient means, and consists of a bottom plate —55—, a front plate —56—, and a rear plate —57—. The top portions of both front plate —56— and rear plate —57— are bent inwardly to form a partial closure over bottom plate —55— with sufficient space between them to permit the passage along cross-head —51— of selective pin —50—. The inner face of rear plate —57— is flat and the inner face of front plate —56— has a series of spaced notches —58—58, of a size and shape to engage selective pin —50— and hold the same against accidental displacement.

A selective pin control —59— is placed in position on bottom plate —55— after which front plate —56— and back plate —57— are placed in position and secured to bottom plate —55— by screws —60—60— or other convenient means.

Selective pin control —59— consists of a front member —61—, rectangular in cross-section, with a width less than the width of bottom plate —55— and with a length sufficiently small in relation to the length of cross-head —51— so that it may be moved along the same to permit the registration of selective pin —50— with any one of notches —58—, and a rear member —62—. Front member —61— has a hole —63— for the reception of selective pin —50— and two horizontally disposed sockets —64, 64— opening towards rear member —62— for the reception of springs —65, 65— and pins —66, 66— carried by rear member —62—. Front member —61— and rear member —62— are normally in spaced relation with springs —66, 66— holding front member 61 against front plate —56—, and rear member —62— against back plate —57—.

In order to accomplish the result for which the last described device is designed, it is necessary that the operator be able to position selective pin —50— in any one of notches —58— as desired (for a purpose hereafter described) and the means to accomplish this result is best shown in Figures 13 to 18 inclusive. A frame 71 extends over belt 14 and carries two spaced parrallel tracks —72, 72— running transversely of belt —14— and in spaced relation thereto. A carriage —73— is mounted on frame —71— for relative movement thereto by means of rollers —74, 74— moving on tracks —72, 72—. The position of rollers —74, 74— is indicated at —a— in Figure 13, and a detail of one is shown in Figure 16 wherein roller —74— and housing —75— are fixed in position on carriage —73— by means of bolt —76—.

Carriage —73— carries a push bar —77— disposed diagonally to the direction of movement of the carriage —73— and towards the direction of movement of belt —14—. The postion of push bar —77— is such that when any part of it is disposed over belt —14— selective pin —50— will strike push bar —77— and will be forced laterally of cross-bar —51— until it passes by the outer end of push bar —77—. This lateral movement of pin —50— is permitted through the compression of springs —65, 65— in selective pin control —59— which thereby allows the backward movement of pin —50— to give clearance in moving from one notch —58— to another. When cross-bar —51— approaches push bar —77— pin —50— is always in the starting position at the end of cross-bar —51— which first approaches push-bar —77—. The starting position of selective pin —50— is indicated by —b—, Figure 13, and the means whereby selective pin —50— is automatically returned to this position will be hereinafter described.

Carriage —73— has a center plate —78— running longitudinally from the rear end piece —79— thereof to push bar —77—, which center plate —78— carries on its under face a series of rack teeth —80— running longitudinally thereof. A shaft —81— having a ring gear —82— on its central portion and a bevel gear —83— at one end is journaled in bearings —84— and —85— affixed to uprights —86— and —87— respectively of frame —71—.

Shaft —81— is disposed in a line at right angles to the direction of movement of carriage —73— and is so disposed that gear —82— meshes with rack teeth —80— for operative engagement therewith. A vertical shaft —88— having a bevel gear —89— on the upper end and a bevel gear —90— on the lower end is journaled in bearings —91— and —92— respectively. Bearing —91— is fixed on a side member —93— of frame —71—, the support for bearing —92— not being shown. Upper bevel gear —89— meshes with bevel gear —82— for operative engagement therewith. A horizontal shaft —94— having a bevel gear —95— at one end and a hand-wheel —96— at the other is journaled in bearing —97— (the support for the bearing not being shown) bevel gear —95— being in mesh with bevel gear —90— for operative engagement therewith. Bearing —97— carries an indicating segment —98— in a plane normal to the axis of rotation of handle wheel —96— which carries a cooperating pointer —99—.

Indicating segment —98— has a series of circular depressions —100, 100— which coact with a ball —101— in pointer —99— to yieldingly hold hand-wheel —96— in any desired position. Rotation of hand-wheel —96— in one direction will cause forward movement of carriage —73— by means of the connecting shafts, gears and rack teeth just described, and a rotation of hand-wheel —96— in the opposite direction will cause a backward movement of carriage —73—. The ratio of this gearing is such that the movement of pointer —99— from one depression —100— to the next will be translated into the movement of push-bar —77— a sufficient distance to cause selective pin —50— to move from one notch —58— to the next. In consequence, the operator, by use of indicator —98— and pointer —99—, may pre-determine into what notch —58— push-bar —77— will place selective pin —50—.

Deflectors —12, 12— heretofore mentioned as being positioned along conveyer —11— are shown in Figures 19 to 23 inclusive.

Deflector bar 102 has one end mounted on upright 103 at one side of conveyer —11— and is held in a horizontal position by brace-rod 104. Upright 103 has its top end journaled in an overhead bearing 105 and its lower end journaled in a bearing 106 attached to the frame 107 of conveyer 11. Upright 103 extends downwardly through bearing 106 and carries on its end a crank-arm 108. A bell-crank 109 is pivotally mounted on frame 110 with its vertical arm connected to crank-arm 108 by link 111. An overhead shaft 112 is journaled in frame 113 above selecting belt —14— extending transversely thereof, and carries on one end a crank-arm 114 connected to the horizontal arm of bell-crank 109 by means of link 115. Shaft 112 carries a tab 116 which extends downwardly into the path of travel of pin —50— on selecting belt —14—.

It will be seen that when pin —50— strikes tab 116 and carries it forward and upwardly, shraft 112 will be rotated thereby moving upwardly crank-arm 114, link 115 and the horizontal arm of bell-crank 109, which will cause link 111 to move rearwardly and cause the rotation of upright 103 through the movement of crank-arm 108. The rotation of upright 103 will move deflector-bar 102 across conveyer 11 into the deflecting position shown by dotted lines in Figure 19, whereby any merchandise container moving along conveyer 11 will strike deflector-bar 102 and be diverted onto branch conveyer 13. In order to retain deflector bar 102 in position until a container has been diverted, a latch is provided as shown in Figures 20, 21. A shaft 117 is journaled in side members 118, 119 of branch conveyer —13— and carries on one end a crank-arm 120 connected by link 121 to the lower end of vertical shaft 122 which is journaled for vertical movement in bearing 123 which is fixed to sidebar 107 of conveyer 11. Shaft 122 carries on its upper end latch 125 normally held in raised position by spring 126—.

Latch 125 is positioned so that it will engage deflector bar 102 when the latter is moved to the deflecting position. A tab 127 extends upwardly from shaft 117 above the level of the top surface of conveyer 13, and in the path of any container moving along conveyer 13. Deflecting bar 102 being engaged with latch 125, it will be understood that when a container moves along conveyer 13 and strikes tab 127, the latter will be moved forwardly and downwardly, thereby rotating shaft 117 and causing crank-arm 120, link 121 and shaft 122 to move downwardly and carry latch 125 out of engagement with deflector-bar 102, which will be returned to the non-operative position through the action of spring 128 on crank-arm 108, which will cause rotation of upright 103.

It will be understood that different deflectors will have tab 116 positioned at different points on shaft 112 so that they may or may not be actuated by pin —50—, depending upon the location of pin —50— in cross-bar —51—.

The selective positioning of pin —50— by means of carriage —73— and push-bar —77— requires that pin —50— be in the starting position (shown by Figure 13) when it comes in contact with push-bar —77—, and the means to accomplish this result is shown in Figures 23 and 24. A pin-setting bar —129 is secured to frame 130 of selecting belt 14 beyond the last deflector 12 by means of rivets 131, or other convenient means.

Bar 129 runs diagonally across belt —14— and carries a depending lip 132 positioned to engage pin —50— and cause it to move transversely of cross-bar —51— until it passes beyond the end of lip 132 and into the starting position —b—.

Figures 25 and 26 illustrate a type of fixed deflectors used on storage floors A, B, C and D, consisting of a deflecting bar 133 fixed in uprights 134, 135, by rivets 136, 136, or other convenient means, uprights 134, 135 being fixed on side-bars 137, 138 respectively of conveyer —1— by rivets 140, 140 or other convenient means.

Deflecting bar 133 is disposed diagonally across conveyer —1— in such a position that when a merchandise container comes in contact with bar 133, it will move along the same and pass from conveyer —1— onto branch conveyer 141 and thence into chute —2—. Figure 27 shows a similar type of deflector with uprights 142, 143 of greater height than uprights 134, 135, which permits merchandise containers of certain heights to pass under deflecting bar 133 without coming in contact therewith.

*Operation*

For the purpose of illustrating the functioning of our device, we will describe the distribution of merchandise containers coming from floor A, it being understood that the merchandise containers coming from floors B, C, D are subject to a similar method of distribution. The operator, who is conveniently located so as to be able to observe the merchandise containers as they approach the spacing device —8— (his position being indicated at 15, Figure 1) throws a switch (not shown) to start motor —9— which will put conveyer —6— in motion. This will cause containers —4, 4— to move from chute —2— onto conveyer —7— and thence forward to spacing device —8—. The operator will see the containers as they approach and will know to which of the branch conveyers —13, 13— they should be despatched. When he has determined this, he will turn wheel —96— the proper distance to effect the setting of a pin —50— in the proper position on selecting belt —14— to actuate a deflector —12— at the branch conveyer —13— to which he wishes to send the leading box.

The following pin —50— in the succeeding cross-bar —51— will actuate the lifting mechanism to raise roller —17— and permit the leading box to pass onto conveyer —11—. It will be understood that selecting belt —14— carries a plurality of cross-bars —51— in spaced relation, and that pins —50— in cross-bars —51— will actuate the lifting mechanism for roller —17— as they pass the same.

By this arrangement a deflector operating pin will always reach the deflector a certain given length of time in advance of the container on conveyer —11—. If the operator desires to send several successive containers to the same branch conveyer he will leave wheel —96— in position so that successive pins —50— will be set at the same deflecting position. On the other hand, he may, if he desires, change the position of wheel —96— so that the second container will be deflected to a different branch conveyer from the one to which the first container is despatched. In case he desires to send containers the length of conveyer —11— without deflection to any branch conveyer, he will leave all pins —50— in the starting position in which they will not actuate any deflector, but will actuate the lifting mechanism for roller —17—.

If he desires to send a number of containers the length of conveyer —11— without deflection to any branch conveyer, he may turn handle —25— and raise the forward portion —21— of spacing device —8— which will permit the containers to move over stop members —34, 34— and onto conveyer —11—, but not in spaced relation.

It will be understood that the number of cross-bars —51— on selecting belt —14— and the number of deflecting positions for pins —50— in cross-bars —51— may be varied at will, as may the number and position of branch conveyers —13—, for although we have shown and described a specific structure and form of part, we do not desire to restrict ourselves to the exact shape, form or arrangement of parts as various changes may be made within the scope of the appended claims.

We claim:

1. In a conveying system, a means for delivering articles to selected parts of the conveying system comprising merchandise containers, a feeder conveyer, a distributing conveyer, means for delivering the merchandise containers from the feeder conveyer to the distributing conveyer, branch conveyers leading from the distributing conveyer, a movable deflector at each branch conveyer, an auxiliary belt, and means on said auxiliary belt for selectively actuating said deflectors.

2. In a conveying system, a main conveyer, branch conveyers leading from the main conveyer, a movable deflector at each branch conveyer for deflecting articles from the main conveyer to the branch conveyer, an auxiliary belt, a means on the auxiliary belt for actuating the deflectors, and additional means for positioning the first named means in a selected one of a plurality of positions.

3. In a conveying system, a storage conveyer, a distributing conveyer, merchandise containers, a means for delivering a merchandise container from the storage conveyer to the distributing conveyer, an auxiliary belt, and means on the auxiliary belt for actuating said delivering means.

4. In a conveying system, a main conveyer, branch conveyers leading from the main conveyer, a movable deflector at each branch conveyer, merchandise containers on the main conveyer, an auxiliary belt, and means on said belt for moving a selected deflector into operative position whereby a merchandise container will be deflected to a selected branch conveyer.

5. A device as in claim 4 having means on the branch conveyer actuated by the merchandise container whereby the deflector will be returned to the non-operative position.

6. In a conveying system, a main conveyer, branch conveyers leading from the main conveyer, a deflector at each branch conveyer, merchandise containers on the main conveyer, an auxiliary belt, a plurality of pins carried by the belt, means for moving said pins transversely of the belt to a selected position, and individual means operatively connected with said deflectors whereby a pin in a given position on said belt will cooperate with a single one of said individual means to move a selected deflector to the operative position.

7. A device as in claim 6, in which the means for moving the pins transversely of the belt is located in a position remote from the deflectors.

8. A device as in claim 6 in which the positioning of a pin transversely of the belt is accomplished prior to the cooperation of the pin with one of said individual means.

9. In a conveying system, a main conveyer, branch conveyers leading from the main conveyer, a deflector at each branch conveyer, an auxiliary belt, a plurality of deflector actuating pins carried on the auxiliary belt, means for positioning said pins in selected positions transverse of the auxiliary belt, and means for returning the pins to the starting position after a deflector has been actuated.

10. In a conveying system, a storage conveyor, merchandise containers on the storage conveyer, a distributing conveyer, branch conveyers leading from the distributing conveyer, a deflector at each branch conveyer, an auxiliary belt, pins carried by said auxiliary belt, means whereby a pin in a given position on the belt will actuate a selected deflector, means for positioning a pin in a selected position on the belt, means for returning a pin to the starting position after the selected deflector has been actuated, and means coacting with said pins to cause the transfer of merchandise containers from the storage conveyer to the distributing conveyer.

11. In a conveying system, a main conveyer, branch conveyers leading from the main conveyer, a deflector at each branch conveyer, an auxiliary belt, a plurality of pins slidably mounted on the auxiliary belt for movement transversely thereof, means for moving a pin to a selected position on the belt including a carriage movable transversely with relation to the belt, a push-bar carried by the carriage for engagement with said pins, means for positioning the push-bar selected distances transverse of the auxiliary belt, and additional means whereby a pin in a given position on the auxiliary belt will actuate a selected deflector.

12. In a conveying system, a main conveyer, branch conveyers leading from the main conveyer, a deflector at each branch conveyer, merchandise containers on the main conveyer, a movable member, a plurality of pins carried by the movable member, means for moving said pins transversely of the moving member to a selected position, and individual means operatively connected with said deflectors whereby a pin in a given position on said movable member will cooperate with a single one of said individual means to move a selected deflector to the operative position.

13. In a conveying system, a means for delivering articles to selected parts of the conveying system comprising merchandise containers, a feeder conveyer, a distributing conveyer, means for delivering the merchandise containers from the feeder conveyer to the distributing conveyer in spaced relation, branch conveyers, leading from the distributing conveyer, a movable deflector at each branch conveyer, an auxiliary belt, and means on said auxiliary belt for selectively actuating said deflectors.

14. In a conveying system, a storage conveyer, merchandise containers on the storage conveyer, a distributing conveyer, branch conveyers leading from the distributing conveyer, a deflector at each branch conveyer, an auxiliary belt, pins carried by said auxiliary belt, means whereby a pin in a given position on the belt will actuate a selected deflector, means for positioning a pin in a selected position on the belt, means for returning a pin to the starting position after the selected deflector has been actuated, and means for transferring merchandise containers from the storage conveyer to the distributing conveyer.

15. In a conveying system, a main conveyer, branch conveyers leading from the main conveyer, a movable deflector at each branch conveyer, an auxiliary belt, and means on said belt for causing a selected deflector to move into operative position, whereby an article on the main conveyer will be deflected to a selected branch conveyer.

16. In a conveying system, a main conveyer, branch conveyers leading from the main conveyer, a movable deflector at each branch conveyer, an auxiliary belt, and a plurality of means on said belt located in spaced relation lengthwise of said belt for causing selected deflectors to move into operative position, whereby an article on the main conveyer will be deflected to a selected branch conveyer.

In witness whereof we have hereunto set our hands this 10 day of November 1927.

JAMES T. COWLEY.
LAVONT C. ALLEN.